United States Patent
Soennichsen

[11] Patent Number: 5,813,096
[45] Date of Patent: Sep. 29, 1998

[54] SNAP FASTENER WITH A SAFETY LOCK

[75] Inventor: Hans-Ketel Soennichsen, Jork, Germany

[73] Assignee: Daimler-Benz Aerospace Airbus GmbH, Hamburg, Germany

[21] Appl. No.: 798,181

[22] Filed: Jan. 24, 1997

[30] Foreign Application Priority Data

Jan. 26, 1996 [DE] Germany .................. 196 02 828.0

[51] Int. Cl.$^6$ .......................... A44B 17/00; F16B 21/00
[52] U.S. Cl. .................. 24/573.1; 24/297; 24/453; 411/509
[58] Field of Search ................... 24/573.1, 297, 24/324, 662, 289, 453; 411/508, 509, 913, 54

[56] References Cited

U.S. PATENT DOCUMENTS

| | | | |
|---|---|---|---|
| 1,978,087 | 10/1934 | Johnson | 24/453 |
| 3,551,963 | 1/1971 | Mosher, Jr. et al. | 24/662 |
| 3,803,670 | 4/1974 | Johnson . | |
| 4,559,679 | 12/1985 | Downey | 24/573.1 |
| 5,329,676 | 7/1994 | Kobayashi | 24/573.1 |

Primary Examiner—Victor N. Sakran
Attorney, Agent, or Firm—W. G. Fasse; W. F. Fasse

[57] ABSTRACT

A snap fastener for securing two structural components to each other has a fastener section with a head and stem with at least one axial slot (6, 7) in the stem opposite the head to form snap-on members (3A, 3B, ... ) spaced by the slot (6, 7) in the stem (S). A washer fits over the snap-on members around the stem when the snap-on members are pressed toward each other. The locking members have shoulders (4) that engage the washer and form the snap-on connection. A locking bail (12) fits with a central portion into the slot so that the snap-on members cannot be pressed together anymore, thereby preventing the unlocking. The locking bail has at least one locking hook (15 or 16) that engages the washer so that the central portion (13) of the locking bail (12) cannot escape out of the slot. The locking hook can be intentionally disengaged against its elasticity for removing the snap fastener.

9 Claims, 2 Drawing Sheets

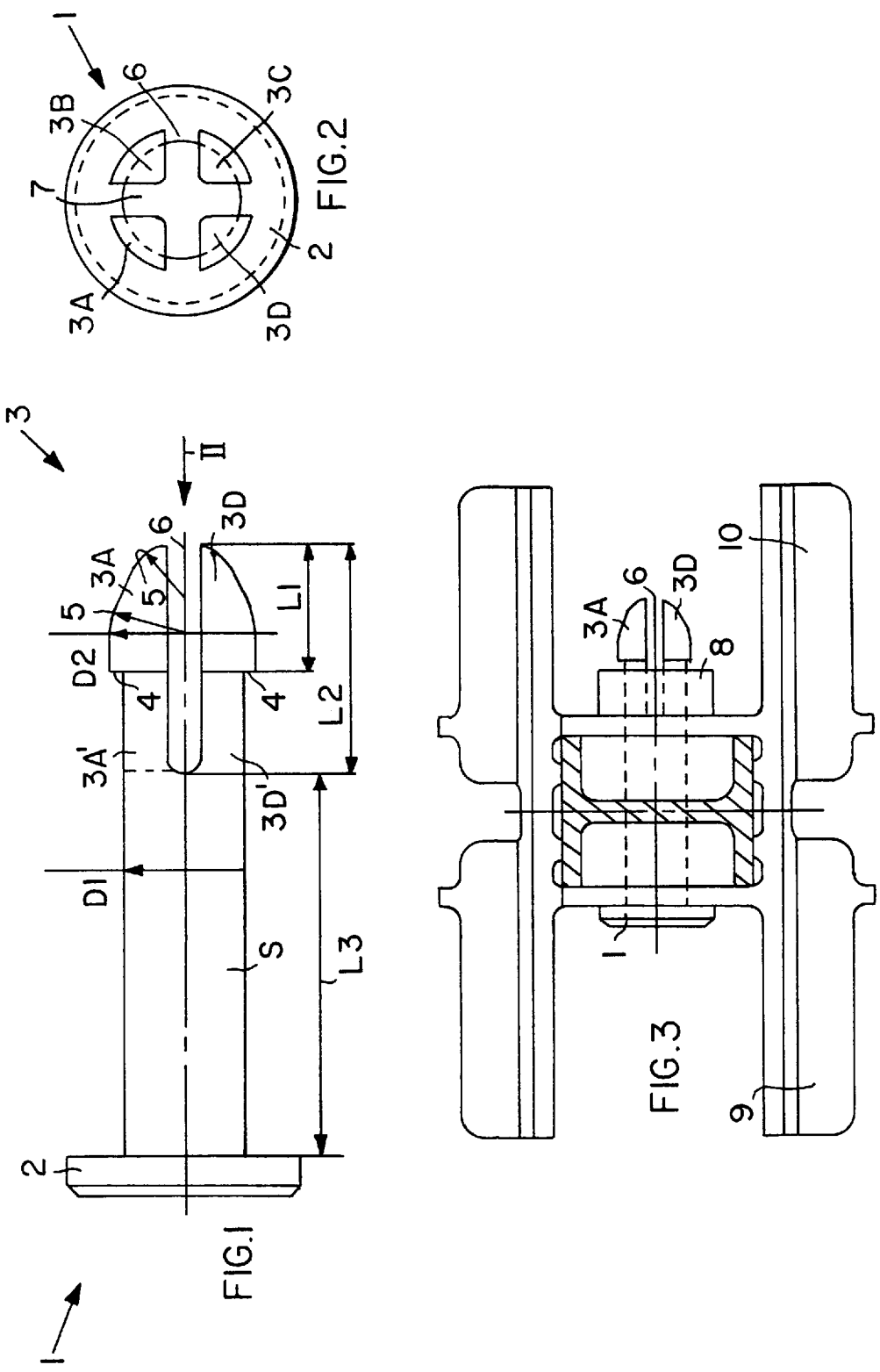

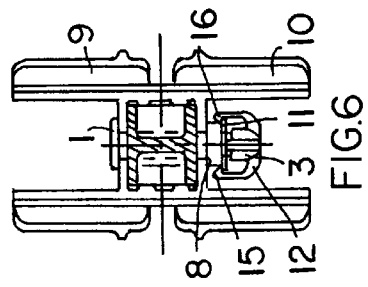
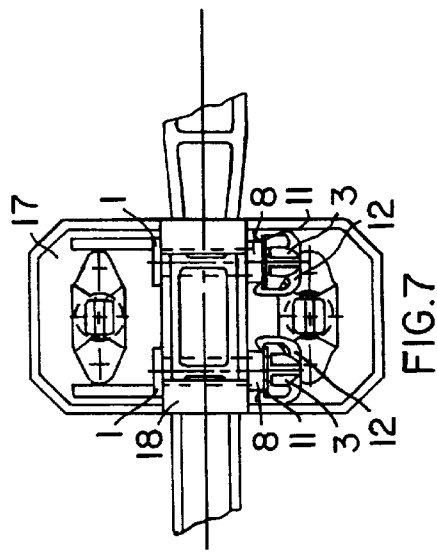
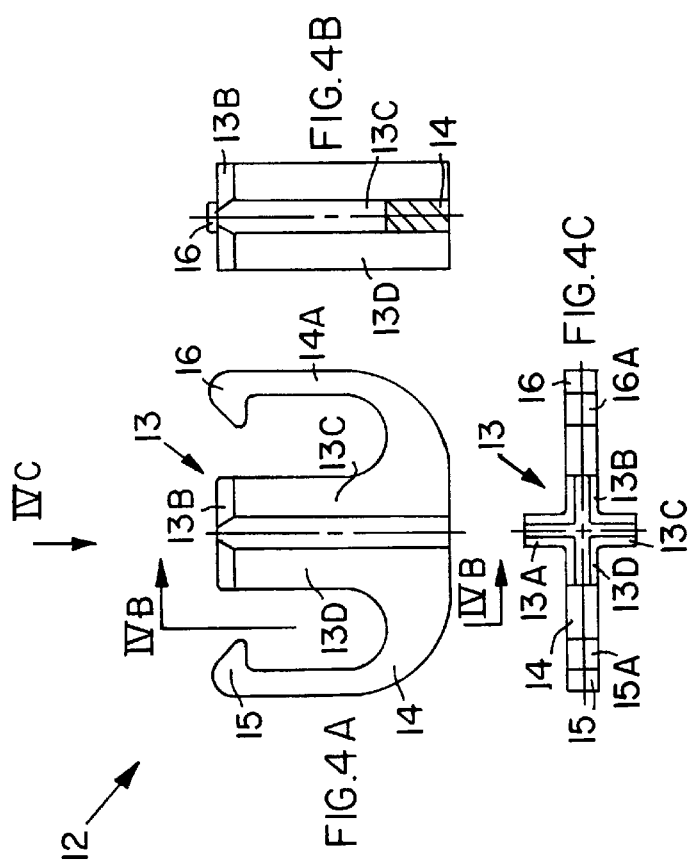
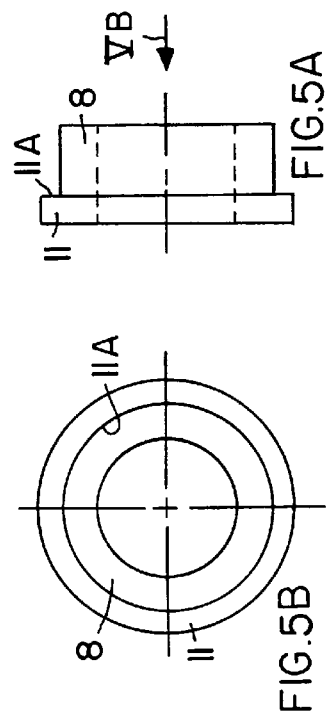

SNAP FASTENER WITH A SAFETY LOCK

FIELD OF THE INVENTION

The invention relates to snap fasteners with a safety lock. Such fasteners are employed to secure two structural components to each other, especially structural components in aircraft construction.

BACKGROUND INFORMATION

Snap fasteners are used to releasably interconnect at least two structural components such as sheet metal sections or the like, particularly structural components in the aircraft manufacture. Such fasteners include a pin forming a stem having a fastener head at one end of the stem and a locking section at the other end of the stem. Conventionally, the locking section is provided with a slot as disclosed in U.S. Pat. No. 3,803,670 (Johnson), issued on Apr. 16, 1974. With the help of the slot the locking section forms two snap-on members provided with a shoulder facing the fastener head. The elasticity of the fastener material in combination with the slot make it possible to press the two sections toward each other for pushing a safety washer onto the stem. Once the fastener is installed, the safety washer rests against one surface of the structural components held together by the fastener and the above mentioned shoulder of the snap-on members rests against the surface of the safety washer.

Such snap fasteners are pushed through two aligned holes in the structural components. The snap-on members are pressed together, and the safety washer is pushed over the snap-on members onto the stem. When the snap-on members are released their shoulder or shoulders snap into place against the safety washer, thereby completing the connection. By pressing the snap-on members again together, the washer can be removed and the fastener can then be pulled out of the holes. Thus, these fasteners are reusable and quite economical to manufacture. The fasteners can be produced of very tough synthetic materials so that they are also quite durable, whereby these fasteners are particularly suitable for interconnecting structural components in the aircraft manufacture where such fasteners are exposed to high loads.

Other fasteners of this type use a safety washer in combination with a cotter pin passing through one end of the connector shaft. In fact, each end of such pins may be secured by a washer and a cotter pin. These connectors provide substantial strength against longitudinally applied loads resulting in tension stress as well as against cross-wise effective loads resulting in shearing stress. These cotter pin connections are quite reliable against unintended loosening of the fastener unless the cotter pin is lost or breaks. However, these pin connectors with washers and cotter pins require tools for the deformation of the cotter pin in both instances when the connection is made and when the connection needs to be removed. Such use of tools is undesirable, especially where the work needs to be done in a limited space in an aircraft.

In connection with the first mentioned snap fastener connectors, the assembly and disassembly is possible without the use of tools. However, the possibility of an unintentional loosening of such fasteners is not entirely excluded. Therefore, there is room for improvement.

OBJECTS OF THE INVENTION

In view of the above it is the aim of the invention to achieve the following objects singly or in combination:

to provide a snap fastener without the use of cotter pins, which can be manufactured in a cost efficient manner and which can be installed and removed again without the use of tools while simultaneously being able to take up high loads;

to minimize the mounting effort and expense so that in spite of the multitude of such connections that must be made in an aircraft, these connections can be made in a cost efficient manner; and to improve these connectors that in spite of high operating load conditions there is regulation satisfying safety against an unintended loosening of the connection, especially it is necessary that the safety washer cannot pop off in response to high axial loads that occur during the operation of an aircraft.

SUMMARY OF THE INVENTION

The above objects have been achieved according to the invention in that the snap fastener of the type described above is provided with a locking section in the form of a safety bail inserted into the slot of the snap fastener stem, wherein the safety bail has a central section equipped with at least one locking hook for engaging the safety washer. Preferably, the locking bail has two safety hooks that can be snapped in place by pushing the central portion of the locking bail into the slot so that the two hooks can symmetrically engage preferably behind a shoulder of the safety washer. The removal is then also simple by bending the two hooks radially outwardly by pressing the hooks toward each other.

It is a special advantage of the invention that a releasable connection can be produced that is capable of taking up high axial and transverse loads and that it can be made and released without a tool. Even the locking bail can be attached and removed without a tool so that little space is required for the mounting and dismounting. The snap-in connection and construction of the shoulders of the snap-on members that hold the connector in place and the safety hook or hooks that prevent the loosening of the connector are simple and the mounting time compared to other conventional structures of this type is substantially reduced. Even when the present fastener is exposed to substantial axial loads, a "pop-off" of the locking shoulders is prevented because the locking bail prevents the snap-on members from approaching each other across the slot. By providing the safety washer with a shoulder, the safety hook or hooks of the locking bail can latch behind the shoulder on the washer to assure a solid hold. The snap-on shoulders are effective in one axial direction to hold the two components together while the safety hook or hooks are effective in the opposite direction to prevent an unintended disassembly of the fastener.

By providing the fastener stem with two slots that form a cross slot, the squeezing together of the snap-on shoulders (3A, 3B, 3C, 3D) is facilitated. This feature also simplifies the assembly and its subsequent removal if necessary. The prevention of the movement of the snap-on shoulders toward each other is positively assured by providing the locking bail either with a flat centerpiece when there is only one slot in the stem or by providing the center portion also with a cross-sectional configuration when there is a cross-slot in the stem of the fastener.

By making the present fasteners including the safety lock of synthetic materials, especially polyamide, a simple manufacture is combined with a substantial toughness of the finished product, whereby not only aircraft strength standards are achieved, but also weight reductions are accomplished compared to making these fasteners and lock of metal.

BRIEF DESCRIPTION OF THE DRAWINGS

In order that the invention may be clearly understood, it will now be described, by way of example, with reference to the accompanying drawings, wherein:

FIG. 1 is a side view of a fastener according to the invention having a cylindrical stem with an integral head and four snap-on shoulders formed by a cross-slot;

FIG. 2 is a view in the direction of the arrow II in FIG. 1, illustrating the configuration of the cross-slot;

FIG. 3 shows the releasable connection with the help of a snap fastener according to the invention securing two structural components to each other;

FIG. 4A shows a side view of a locking bail according to the invention with two locking hooks;

FIG. 4B is a sectional view along section line IVB—IVB in FIG. 4A;

FIG. 4C is a view in the direction of the arrow IVC in FIG. 4A;

FIG. 5A is a side view of a safety washer according to the invention;

FIG. 5B is a view in the direction of the arrow VB in FIG. 5A;

FIG. 6 is a view illustrating the connection of two structural components with a snap fastener equipped with a locking bail shown in FIG. 4A; and FIG. 7 is a view similar to that of FIG. 6, however illustrating the use of two snap fasteners as in FIG. 6 close to each other.

DETAILED DESCRIPTION OF PREFERRED EXAMPLE EMBODIMENTS AND OF THE BEST MODE OF THE INVENTION

FIGS. 1 and 2 show a snap fastener 1 comprising a head 2, a stem S, and snap-on members 3A, 3B, 3C, 3D forming a locking head 3. The head 2 is preferably round and the shaft S has preferably a cylindrical shape. However, square and rectangular shapes are also possible. The locking head 3 is divided by two slots 6 and 7 best seen in FIG. 2 to form a cross-slot, whereby the locking head 3 is divided into the four snap-on members 3A, 3B, 3C, and 3D. Each of these members has a shoulder 4 and a curved outer surface 5 ending in a cylindrical portion having a diameter D2 which is larger than the shaft diameter D1 to form the locking or snap-on shoulders 4. The radii that form the curved surface 5 of the locking head 3 are so selected that the shaft S is easily inserted into the axially aligned holes of two structural components 9 and 10 as shown in FIG. 3. The curvature of the surface 5 also facilitates the passing of the locking head members 3A, 3B, 3C, 3D through a central hole in a safety washer 8 also shown in FIG. 3. By pressing the sections 3A to 3D toward each other the gaps 6 and 7 are narrowed against the elasticity of stem portions 3A' to 3D' which connect the respective snap-on members 3A to 3D to the stem S. The width of the slots 6 and 7 and the curve of the surface 5 are so selected that the washer 8 can simply be pushed over the locking head 3, whereby this pushing squeezes the head sections 3A to 3D toward each other against the biasing force of the stem sections 3A' to 3D'. Once the washer 8 assumes the position around the stem sections 3A' to 3D', the snap-on members 3A to 3D snap away from each other, thereby locking the shoulders 4 against the surface of the washer 8. A single slot 6 or 7 would be sufficient to accommodate a locking bail 12 according to the invention for preventing any squeezing of the snap-on members toward each other as will be described in more detail below.

The elasticity of the stem section 3A' to 3D' is determined by the axial length L2 of the slots 6 and 7, whereby L2 is larger than the length L1 of the locking head 3. Also the width of the slots determines the cross-sectional dimension of the stem section 3A' to 3D', thereby influencing the flexibility of these sections.

The length L3 is preferably so selected that it is larger than the thickness of the components 9 and 10 where these components are to be connected to each other as shown in FIG. 3 in order to leave sufficient space for the safety washer 8. The diameter D2 is larger than the diameter of the aligned holes in the structural components 9 and 10, whereby the snap-on members 3A to 3D are pressed together as the shaft is moved through the holes. Once the head sections emerge from the other end of the hole of the second component, the snap-on members 3A to 3D spread out again until the washer 8 is pressed over these members which snap radially outwardly again as soon as the washer 8 is in place, thereby snapping the fastener in place. The connection is easily removed by simply squeezing the members 3A to 3D toward each other for again releasing the connection. Thus, a self-locking, yet releasable connection is achieved according to the invention in which the elasticity and hence the squeezability of the head sections can be controlled in a fine-tuned manner by the dimensioning of the cross-slots 6 and 7 and the above mentioned diameters D1, D2.

Preferably, the dimensioning is such that the thickness of the two components where the components are to be interconnected, is slightly smaller than the length L3 so as not to diminish the shaft cross-sectional area by the slots 6, 7 which should not reach into the hole of the second component 10. In order to obtain a secure seat of the shaft S in the bores of the components 9 and 10, the safety washer 8 has such an axial thickness that it corresponds to the difference between the length L2 minus the length L1. This assures that the shoulders 4 will lock securely against the surface of the washer 8. In this condition the connection can be released only when the snap-on members 3A to 3D are squeezed together. No tool is necessary for this purpose. A simple way of squeezing the members 3A to 3D together is to use another safety washer 8 and push it axially sufficiently onto the members until both washers can be removed together.

FIGS. 4A, 4B, and 4C show in conjunction a safety lock according to the invention for preventing the unintended opening of the present snap fasteners. The safety lock is formed as a bail 12 having a central section 13 and one preferably two locking arms 14 and 14A extending symmetrically away from the central section 13, preferably in a curved manner as shown in FIG. 4A. Locking arm 14 has at its free end a hook 15. Mirror-symmetrically thereto the locking arm 14A has a hook 16. As shown, the central section 13 has a cross-configuration as best seen in FIG. 4C with cross-portions 13A, 13B, 13C, and 13D. This cross-configuration is so dimensioned that the bail 12 fits snugly but removably into the slots 6 and 7 shown in FIG. 2. The insertion is facilitated by tapering the front edges of the cross-portions 13A, 13B, 13C, 13D as best seen in FIGS. 4A and 4B.

When the bail 12 is fully inserted into the slots 6 and 7, it is no longer possible to press the snap-on members 3A to 3D toward each other, whereby the shoulders 4 positively engage the respective surface of the safety washer 8. In order to keep the locking bail 12 latched in a position in the slots 6 and 7, the hooks 15 and 16 engage a shoulder 11A formed by a flange 11 on the safety washer 8 shown in FIGS. 5A and 5B. The engagement of the hooks 15 and 16 against the shoulder 11A provides a double safety feature in addition to the engagement of the shoulders 4 against the washer 8. The hooks 15 and 16 assure that the safety bail 12 cannot get lost, whereby any unintentional release of the snap fastener is avoided, regardless of the direction of forces that tend to unlock the snap fastener, including axially directed forces.

All components of the present snap fastener and safety locking including the bail 12 are preferably made of polyamide which has the toughness required for the present purposes, while simultaneously having the required flexibility for the latching and unlatching operations. Failures due to fatigue of the material nor damages especially to the shoulders 4 and hooks 15, 16 are avoided.

A modification of the bail 12 will have a flat rectangular cross-section for the central section 13 where only one slot 6 or 7 is used, whereby merely the portions 13A and 13C are omitted. Such a flat safety bail can cooperate with a snap fastener having but one slot 6 or 7. The effectiveness of the locking is the same in both instances since the hooks 15 and 16 would be the same in both instances.

FIGS. 6 and 7 show the connection of structural components 9 and 10 similar to FIG. 3, however, the fastener has been reinforced by the safety lock 12 according to the invention. In the embodiment of FIG. 7 two such fasteners are used and each is equipped with a safety lock 12 of the invention, These locks are easily removed again by pulling them axially from the stemps thereby causing the hooks 15, 16 to move slightly radially outwardly away from each other to release the shoulders. The following steps for removal of the snap fastener are then the same as described above with reference to FIG. 3. In all instances It is not necessary to use any sort of tool.

Although the invention has been described with reference to specific example embodiments, it will be appreciated that it is intended to cover all modifications and equivalents within the scope of the appended claims.

What is claimed is:

1. A snap fastener with a safety lock, comprising in combination a fastener section (1), a washer (8), and a locking bail (12), said fastener section (1) comprising a head (2), a stem (S) secured to said head (2), at least one slot (6) in said stem opposite said head and at least two snap-on members having shoulders (4) separated by said slot (6) opposite said head, said washer (8) having a central hole through which said snap-on members fit when a said snap-on members are elastically pressed toward each other across said slot (6), said locking bail (12) comprising a center portion (13) fitting into said slot (6) to keep said locking shoulders rigidly spaced from each other when said washer (8) is in place, said locking bail (12) further comprising at least one elastically bendable locking hook (15 or 16) for holding said locking bail in place in said slot, thereby keeping said shoulders (4) of said snap-on members engaged.

2. The snap fastener of claim 1, wherein said washer (8) comprises a flange (11) forming a shoulder (11A) for engagement by said at least one locking hook (15, 16).

3. The snap fastener of claim 1, wherein said slot is a cross slot (6, 7) to form four of said snap-on members (3A, 3B, 3C, 3D).

4. The snap fastener of claim 3, wherein said center portion (13) of said locking bail (12) comprises a cross-configuration fitting into said cross slot.

5. The snap fastener of claim 1, wherein said center portion of said locking section comprises a flat leg (13) fitting into said slot (6).

6. The snap fastener of claim 1, wherein said fastener section (1), said washer (8), and said locking bail (12) are made of elastically deformable synthetic material.

7. The snap fastener of claim 6, wherein said synthetic material is polyamide.

8. The snap fastener of claim 1, wherein said locking bail comprises two elastically bendable locking hooks (14, 14A; 15, 16) arranged diametrically opposite each other.

9. The snap fastener of claim 1, wherein said central section (13) has a tapered edge for leading into said slot.

* * * * *